US010601970B2

(12) United States Patent
Gilmore et al.

(10) Patent No.: US 10,601,970 B2
(45) Date of Patent: Mar. 24, 2020

(54) DEVICE FOR CLEARING LIQUID FROM AN AUDIO TRANSDUCER

(71) Applicant: MOTOROLA SOLUTIONS, INC., Chicago, IL (US)

(72) Inventors: Peter Gilmore, Plantation, FL (US); Scott G. Potter, Coconut Creek, FL (US); Charles Kline, Plantation, FL (US); Stephen D. Hunt, Cooper City, FL (US); Steven Gilmore, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 51 days.

(21) Appl. No.: 15/822,808

(22) Filed: Nov. 27, 2017

(65) Prior Publication Data
US 2019/0166238 A1 May 30, 2019

(51) Int. Cl.
*H04M 1/03* (2006.01)
*H04M 1/18* (2006.01)
*H04R 1/08* (2006.01)

(52) U.S. Cl.
CPC .............. *H04M 1/03* (2013.01); *H04M 1/18* (2013.01); *H04R 1/086* (2013.01)

(58) Field of Classification Search
CPC ...... H04R 1/086; H04R 29/001; H04R 29/00; H04R 3/007; H04R 19/016; H04R 1/00; H04M 1/18; H04M 1/03; H04M 1/035; E04H 1/14; H01H 2223/004; G06F 1/1656; G06F 3/016; F16J 3/06; F16J 15/16; F04B 53/143; B23P 15/06; B23P 15/08; B05D 5/04; G01M 3/26
See application file for complete search history.

(56) References Cited

U.S. PATENT DOCUMENTS

| | | | | |
|---|---|---|---|---|
| 2,034,753 | A | * 3/1936 | Ekstromer | F16C 5/00 417/493 |
| 6,401,752 | B1 | * 6/2002 | Blackbourn | B67D 3/044 137/588 |
| 8,942,401 | B2 | * 1/2015 | Murayama | G01M 3/26 381/332 |
| 9,357,299 | B2 | 5/2016 | Kwong | |
| 9,451,354 | B2 | * 9/2016 | Zadesky | H04R 1/023 |
| 9,510,071 | B2 | 11/2016 | Jones et al. | |
| 9,625,944 | B2 | 4/2017 | Weber | |
| 2008/0310663 | A1 | * 12/2008 | Shirasaka | H04R 19/016 381/355 |
| 2013/0287213 | A1 | * 10/2013 | Sekiyama | H03G 3/20 381/55 |

(Continued)

FOREIGN PATENT DOCUMENTS

| | | |
|---|---|---|
| CN | 105049966 A | 4/2015 |
| WO | 2015047378 A1 | 4/2015 |

*Primary Examiner* — Fan S Tsang
*Assistant Examiner* — Angelica M McKinney
(74) *Attorney, Agent, or Firm* — Perry + Currier, Inc.

(57) ABSTRACT

A device for clearing liquid from an audio transducer is provided. The device comprises an audio transducer and a port from an external surface of the device to the audio transducer. The device further comprises a liquid clearing mechanism for pushing liquid, trapped in the port, out of the port to clear a path for sound between the audio transducer and the external surface, and an actuator for operating the liquid clearing mechanism.

16 Claims, 6 Drawing Sheets

(56) References Cited

U.S. PATENT DOCUMENTS

| | | | |
|---|---|---|---|
| 2015/0205419 A1* | 7/2015 | Calub | G06F 3/016 |
| | | | 345/173 |
| 2015/0221460 A1* | 8/2015 | Teplitxky | H01H 13/06 |
| | | | 200/302.2 |
| 2015/0319534 A1 | 11/2015 | Lippert et al. | |
| 2016/0052017 A1* | 2/2016 | Weber | B05D 5/04 |
| | | | 34/397 |
| 2016/0187980 A1* | 6/2016 | Ray | G06F 3/04886 |
| | | | 345/173 |
| 2016/0239047 A1* | 8/2016 | Weber | G06F 1/1656 |
| 2016/0241945 A1 | 8/2016 | Zadesky et al. | |
| 2017/0006395 A1 | 1/2017 | Loo et al. | |
| 2018/0063634 A1* | 3/2018 | Dave | H04R 7/10 |
| 2018/0084324 A1* | 3/2018 | Vitt | H04R 1/023 |
| 2018/0206354 A1* | 7/2018 | Yoon | H05K 5/0004 |

* cited by examiner

2-III

DEVICE FOR CLEARING LIQUID FROM AN AUDIO TRANSDUCER

BACKGROUND OF THE INVENTION

Audio transducers, such as microphones, at communication devices are prone to retaining liquid when submerged and/or exposed to rain, and the like. The problem may be worse when the microphone is recessed in a port. Audio from a communication device with partially or fully filled microphone ports may be inaudible, rendering the communications device ineffective for transmitting sound that a user intends to be received at the microphone.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: an audio transducer; a port from an external surface of the device to the audio transducer; a liquid clearing mechanism for pushing liquid, trapped in the port, out of the port to clear a path for sound between the audio transducer and the external surface; and an actuator for operating the liquid clearing mechanism.

Another aspect of the specification provides a device comprising: an audio transducer; a port from an external surface to the audio transducer; a flexible depressible button; an air volume inside the flexible depressible button; and a one-way valve between the air volume and the port, wherein, when the flexible depressible button is depressed, air from the air volume moves through the one-way valve to the port and pushes liquid out of the port, the one-way valve closing when the flexible depressible button relaxes back to a rest position.

Another aspect of the specification provides a portable communication device comprising: an audio transducer configured to convert sound to a sound signal; a radio in communication with the audio transducer, the radio configured to wirelessly transmit the sound signal; a port from an external surface to the audio transducer; a liquid clearing mechanism for pushing liquid, trapped in the port, out of the port to clear a path for sound between the audio transducer and the external surface; and an actuator for operating the liquid clearing mechanism.

Another aspect of the specification provides a device comprising: an audio transducer; a port from an external surface of the device to the audio transducer; a membrane in the port, covering the audio transducer; an aperture out of the port; an actuator; and a piston having a wiper face adjacent the membrane in a biased position, wherein, when the actuator is actuated, the piston moves the wiper face across the membrane to push liquid out of the port, through the aperture.

Another aspect of the specification provides a device comprising: an audio transducer; a port from an external surface of the device to the audio transducer; a membrane in the port, covering the audio transducer; an aperture out of the port; a flexible depressible button; an air volume inside the flexible depressible button; and an air-power piston between the air volume and the port, the air-power piston having a wiper face adjacent the membrane in a biased position, the air-power piston biased towards the air volume, wherein, when the flexible depressible button is depressed, the air volume causes the air-power piston to move the wiper face across the membrane to push liquid out of the port, through the aperture.

Another aspect of the specification provides a device comprising: an audio transducer; a port from an external surface of the device to the audio transducer; a membrane in the port, covering the audio transducer; an aperture out of the port; an actuator; and a piston including a solenoid, the piston having a wiper face adjacent the membrane in an unactuated position, wherein, when the actuator is actuated, the solenoid moves the wiper face across the membrane to push liquid out of the port, through the aperture.

Figure 1:
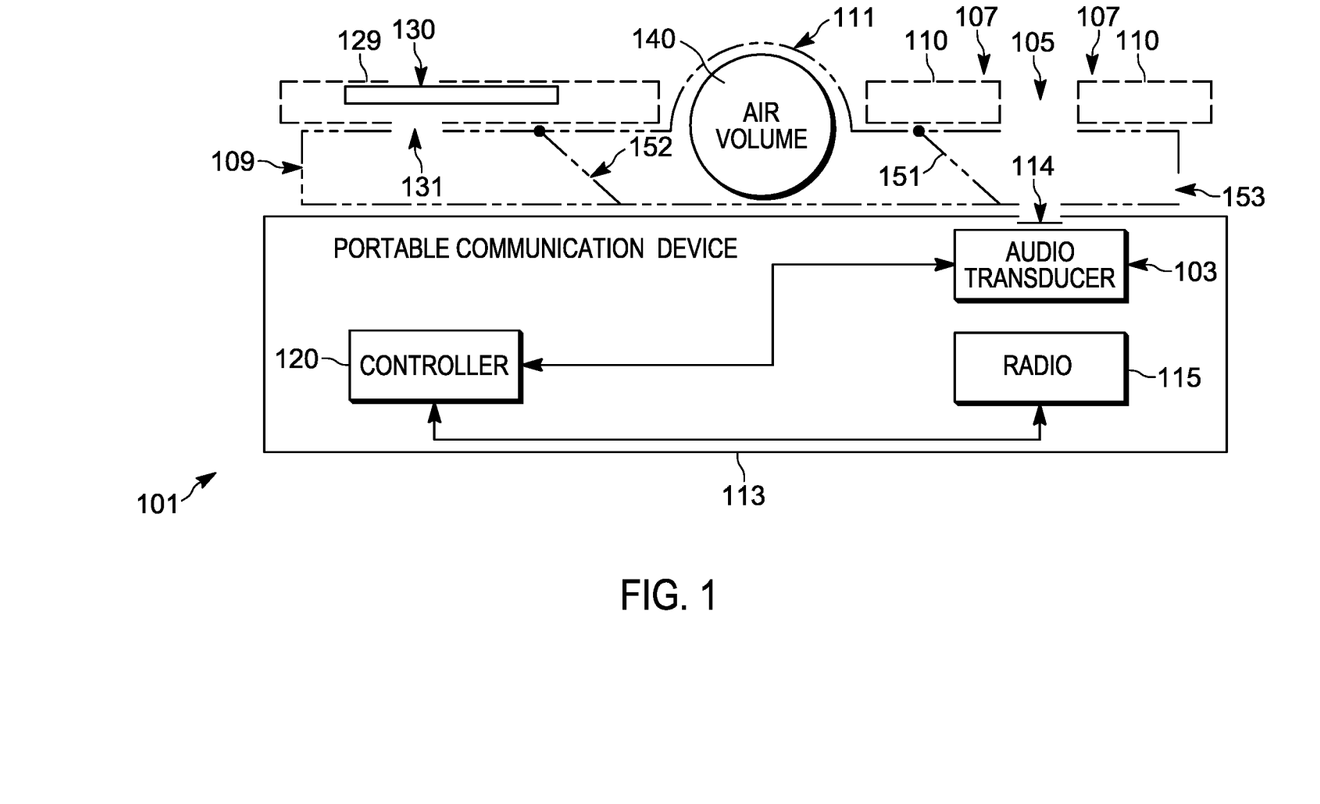
FIG. 1 depicts a device for clearing liquid from an audio transducer in accordance with some embodiments.

FIG. 1 is a schematic partial cross-section of a device 101 that includes: an audio transducer 103; a port 105 from an external surface 107 to the audio transducer 103; a liquid clearing mechanism 109 for pushing liquid, trapped in the port 105, out of the port 105 to clear a path for the sound through the port 105; and an actuator 111 for operating the liquid clearing mechanism 109. As depicted, the device 101 further comprises a cover 110 over the audio transducer 103 that includes a portion of the port 105, with the external surface 107 being a surface of the cover 110. However, the cover 110 may be optional.

As depicted, the audio transducer 103 is located inside a housing 113 of the device 101, for example at an aperture through the housing 113. As depicted, a membrane 114 (which, in example embodiments comprises a waterproof membrane and may include, but is not limited to, polyether ether ketone (PEEK)) is located over the audio transducer 103 at the aperture through the housing 113, to protect the audio transducer 103 from damage due to moisture. As depicted, the membrane 114 is attached to an interior surface of the housing 113, covering the aperture through the housing 113, using, for example, a suitable adhesive, and the like. In some embodiments, the membrane 114 may be coated with a hydrophobic coating. Indeed, an interior of the port 105 may be coated with a hydrophobic coating.

As depicted, the device 101 generally comprises a portable electronic device that further includes a radio 115 in communication with the audio transducer 103, the radio 115 configured to wirelessly receive and transmit sound signals. In specific example embodiments, the audio transducer 103 comprises a microphone and hence the example audio transducer 103 is configured to receive sound received via the port 105, convert the sound to a sound signal, and the radio 115 is configured to wireless transmit the sound signal received from the audio transducer 103. Hence, the membrane 114 is configured to convey sound to the audio transducer 103 for conversion to a sound signal; indeed, in some embodiments, the membrane 114 may comprise a diaphragm of the audio transducer 103.

Water and/or liquid may accumulate in the port 105 and/or at the membrane 114 thereby blocking sound from reaching the audio transducer 103. Hence, the liquid clearing mechanism 109 is provided for pushing liquid, trapped in the port 105 and/or at the membrane 114, out of the port 105 and/or away from the membrane 114.

As depicted, the device 101 further comprises a vent device 129 that includes an air-permeable membrane 130 that may include, but is not limited to, one or more of an air-breathable waterproof membrane material, Gore-Tex™, and the like. For example, the air-permeable membrane 130 is generally both air-permeable and waterproof (e.g. water impermeable) and functions as a vent for the liquid clearing mechanism 109, as described in more detail below. The air-permeable membrane 130 is generally held in place by walls, and the like, of the vent device 129 using adhesive, and the like.

The vent device 129 may be a separate component from the liquid clearing mechanism 109, or may be integrated with the liquid clearing mechanism 109. For example, as depicted there are corresponding apertures 131 between the liquid clearing mechanism 109 and the vent device 129. However, in other embodiments, for example, at least the air-permeable membrane 130 may be located at the aperture 131 of the liquid clearing mechanism 109 without the remaining components of the vent device 129; in other words, the air-permeable membrane 130 may be held in place at the aperture 131 of the liquid clearing mechanism 109 by walls and/or sides of the liquid clearing mechanism 109 using adhesive, and the like.

Furthermore, while the vent device 129 is depicted as a hollow box with an aperture therethrough in which the air-permeable membrane 130 is located, the vent device 129 may comprise a solid rigid (i.e. not hollow) with an aperture therethrough, the air-permeable membrane 130 located in the aperture.

As depicted, the device 101 further comprises a controller 120 and the radio 115 is in communication with the audio transducer 103 via the controller 120. The controller 120 is generally configured to control radio communications, and the like, and other portable electronic device functionality of the device 101.

Indeed, the device 101 may generally comprise a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. However, other suitable devices are within the scope of present embodiments including non-mobile radios and non-mobile communication devices.

Furthermore, the device 101 may be incorporated into vehicles, and the like (for example emergency service vehicles), as a radio, an emergency radio, and the like.

Furthermore, the device 101 may include a radio that includes a radio-speaker-microphone (RSM), the audio transducer 103, the cover 110 (when present), the port 105, the liquid clearing mechanism 109, and the vent device 129 are integrated into the radio-speaker-microphone. In some embodiments, the actuator 111 is also integrated into the radio-speaker-microphone.

In some embodiments, the device 101 is specifically adapted for emergency service radio functionality, and the like, used by emergency responders and/or emergency responders, including, but not limited to, police service responders, fire service responders, emergency medical service responders, and the like. In some of these embodiments, the device 101 further includes other types of hardware for emergency service radio functionality, including, but not limited to, push-to-talk ("PTT") functionality.

The radio 115 is generally configured to wirelessly communicate with other devices using one or more wireless communication network, and may include, one or more radios and/or connectors and/or network adaptors, configured to communicate wirelessly, with network architecture that is used to implement one or more communication channels between the device 101 and other devices. In some embodiments, the radio 115 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications.

In yet further embodiments, the radio 115 includes one or more local area network or personal area network transceivers operating in accordance with an IEEE 802.11 standard (e.g., 802.11a, 802.11b, 802.11g), or a Bluetooth transceiver. In some embodiments, the radio 115 is further configured to communicate "radio-to-radio" on some communication channels, while other communication channels are configured to use wireless network infrastructure.

Example communication channels over which the radio 115 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

As depicted, the actuator 111 comprises a flexible depressible button, and the liquid clearing mechanism 109 comprises: an air volume 140 inside the flexible depressible button; and a one-way valve 151 between the air volume 140 and the port 105, such that, when the flexible depressible button is depressed, air from the air volume 140 moves through the one-way valve 151 to the port 105 and pushes the liquid out of the port 105, the one-way valve 151 closing when the flexible depressible button relaxes back to a rest position. As depicted, the one-way valve 151 is in a rest position and is closed.

As depicted, the device 101 and/or the liquid clearing mechanism 109 further comprising a second one-way valve 152 between the air volume 140 and the air-permeable membrane 130, the second one-way valve 152 being closed when the flexible depressible button is depressed, and open when the flexible depressible button relaxes to the rest position, such that replacement air moves through the air-permeable membrane 130 to fill the air volume 140. As depicted, the second one-way valve 152 is in a rest position and is closed.

While in the depicted example embodiments, each of the one-way valves 151, 152 comprises a respective moveable flap, any suitable one-way valves are within the scope of the present specification.

The air-permeable membrane 130 is water-impermeable and is between an interior of the device 101 (e.g. the interior of the vent device 129) and an exterior of the device 101; hence, replacement air moving through the air-permeable membrane 130 is received from an exterior of the device 101.

In a rest position, the flexible depressible button (i.e. the actuator 111) defines the air volume 140 and when the flexible depressible button is depressed and released, the flexible depressible button relaxes back to the rest position. Such relaxation causes suction to occur within the flexible depressible button to fill the air volume 140, such suction closing the one-way valve 151 and opening the second one-way valve 152. When the flexible depressible button relaxes back to the rest position, and the air volume 140 is full, the suction ends and the second one-way valve 152 closes.

Hence, in general, the flexible depressible button is biased towards the rest position. As depicted, such a bias is achieved by providing the flexible depressible button in the form of a flexible bubble shape that, when deformed and/or compressed due to pressure (e.g. from a finger of a user), tends back to the bubble shape when released, similar to a spring relaxing to a rest position. Indeed, in other embodiments, the actuator 111 may include a depressible button that is biased back to the rest position using a spring mechanism.

In some embodiments, when liquid is pushed out of the port 105, the liquid is at least partially pushed through the port 105. However, as depicted, the device 101 further comprises an aperture 153 for evacuating liquid from the port 105. In particular, the aperture 153 is located in a direction defined by a path from the one-way valve 151 to the membrane 114, and/or the aperture 153 is located along a path of airflow from the one-way valve 151, when the actuator 111 (e.g. the flexible depressible button) is actuated.

Furthermore, a passageway for airflow from the actuator 111 and the air volume 140 to the one-way valve 151, the audio transducer 103 and the aperture 153 is generally depicted in FIG. 1 as being a straight passageway, such a passageway may not be straight. Indeed, while the actuator 111 and the audio transducer 103 are depicted as being on a same side and/or edge of the device 101, in other embodiments, the actuator 111 and the air volume 140 may be on a different side and/or edge from the audio transducer 103, with a passageway for airflow from the actuator 111 and the air volume 140 including corners, curves and the like.

As depicted, the components of the liquid clearing mechanism 109 and the flexible depressible button (i.e. the actuator 111), including the one-way valves 151, 152, the air volume 140, the aperture 153, and the portion of the port 105 that is located in front of the audio transducer 103, are provided as an integrated unit and/or a flexible integrated unit, and may be manufactured from a flexible material, including, but not limited to, silicone materials, and the like.

As depicted, the flexible integrated unit of the liquid clearing mechanism 109 further includes a portion of the port 105 that is located in front of the audio transducer 103 and extends past the audio transducer 103 defining a further space between the housing 113 and the cover 110; such a space is optional and may be omitted.

The cover 110, when present, may comprise a rigid material (including, but not limited to, metal, plastic, and the like) and may include a speaker grill (not depicted) which covers the port 105, with corresponding apertures between the cover 110 and the portion of the port 105 that is located in front of the audio transducer 103.

The vent device 129, other than the air-permeable membrane 130, may also comprise a rigid material (including, but not limited to, metal, plastic, and the like).

The rigid cover 110 and the rigid vent device 129, together, may comprise a rigid integrated unit that at least partially surrounds the flexible integrated unit of the liquid clearing mechanism 109 with an aperture for the flexible depressible button (i.e. the actuator 111) to extend therethrough, and/or for enabling the flexible depressible button to be accessible to a user, and a further aperture that corresponds to the aperture 153.

The rigid cover 110 and the rigid vent device 129 may be assembled with, and/or attached to, the flexible integrated unit of the liquid clearing mechanism 109 using any suitable adhesive and/or attachment mechanism, including, but not limited to mechanical clips, and the like.

Indeed, the rigid cover 110 and the rigid vent device 129 may be assembled with, and/or attached to, the flexible integrated unit of the liquid clearing mechanism 109, and attached to the housing 113 that contains the remaining components of the device 101.

Hence, the cover 110, the port 105, the liquid clearing mechanism 109, the vent device 129, and the actuator 111 may be provided as components separate from the remainder of the device 101, and may be mated with the housing 113 of the device 101 to provide the device 101 with audio-transducer liquid-clearing functionality. For example, the cover 110, the port 105, the liquid clearing mechanism 109, the vent device 129, and the actuator 111 may be sold and/or provided separately from the remainder of the device 101 and attached to the device 101, for example by a user of the device 101.

For example, as depicted, the device 101 comprises the housing 113 at which the audio transducer 103 is located, which is covered by the membrane 114, and the cover 110, the port 105, the liquid clearing mechanism 109 and the actuator 111 are mated to the housing 113 with the port 105 located over the audio transducer 103.

Alternatively, the cover 110, the port 105, the liquid clearing mechanism 109, the vent device 129, and the actuator 111 may be integrated with the housing 113 and/or attached to the housing 113 at a time of manufacture of the device 101.

Furthermore, while the audio transducer 103, the cover 110, the port 105, the liquid clearing mechanism 109, the vent device 129 and the actuator 111 are described in example embodiments as being components of a portable communication device, the audio transducer 103, the cover 110, the port 105, the liquid clearing mechanism 109, the vent device 129 and the actuator 111 may be components of other types of devices, including non-portable devices that may be exposed to liquid and/or moisture and/or water.

Figure 2:
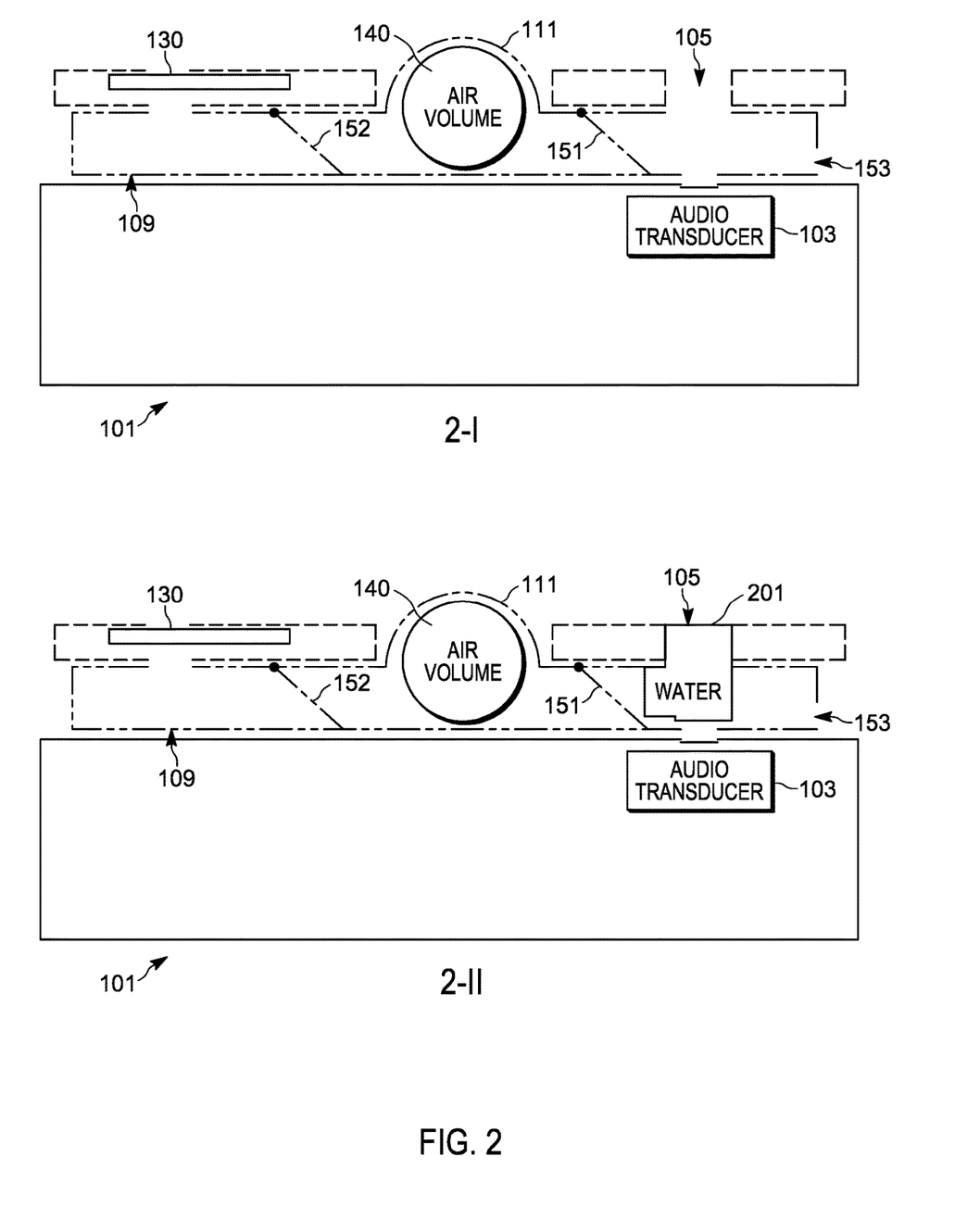
FIG. 2 depicts a first portion of a sequence for operating the device of FIG. 1 in accordance with some embodiments.
Figure 3:
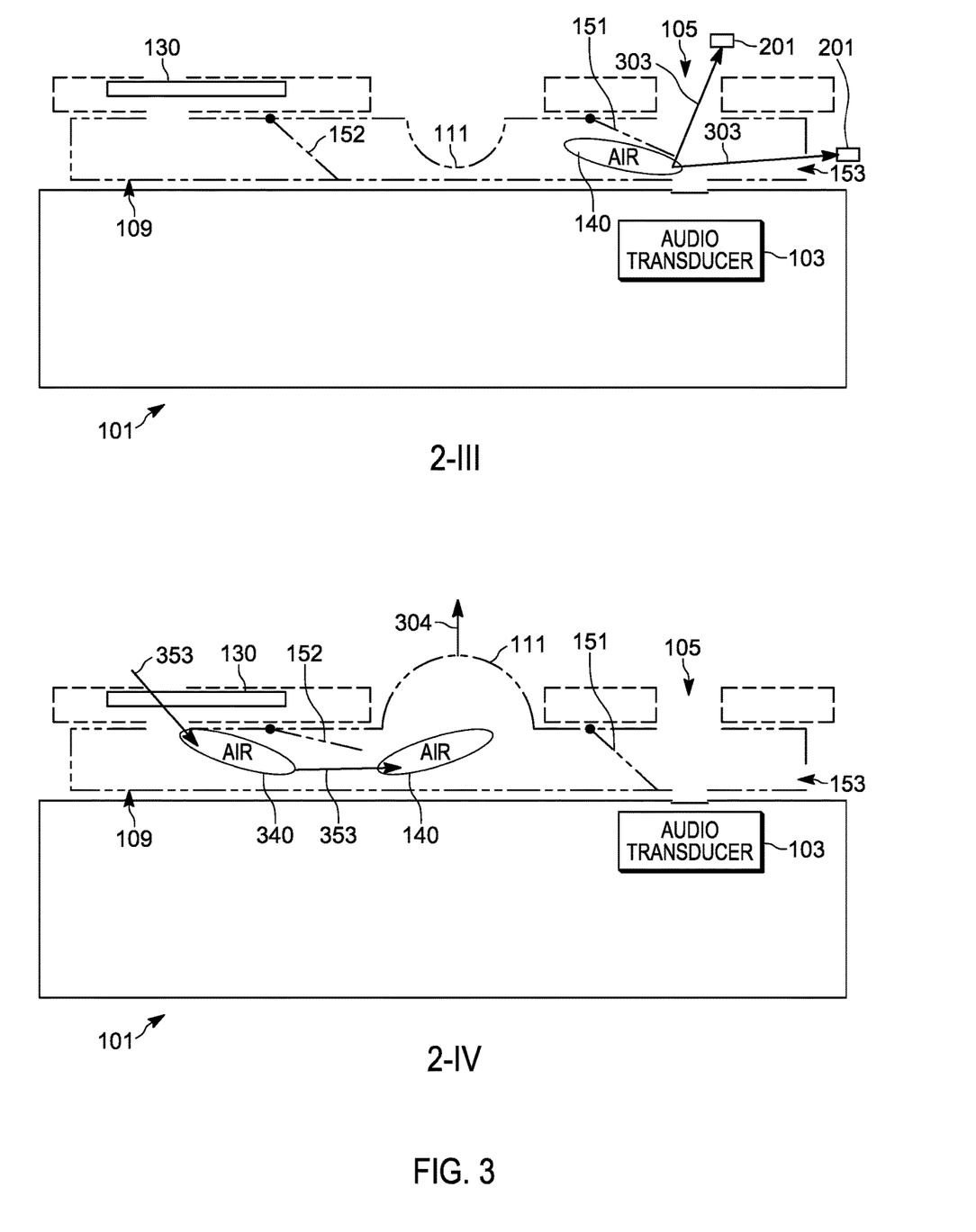
FIG. 3 depicts a second portion of a sequence for operating the device of FIG. 1 in accordance with some embodiments.

Attention is next directed to FIG. 2 and FIG. 3 which depict a sequence of views 2-I, 2-II, 2-III, 2-IV depicting the liquid clearing mechanism 109 of the device 101 in use to clear liquid from the port 105. While not all the components of the device 101 are depicted and/or numbered in FIG. 2 and FIG. 3, for clarity, they are assumed to be nonetheless present.

With reference to FIG. 2, the view 2-I depicts the device 101 prior to liquid accumulating in the port 105. In particular, each of the one-way valves 151, 152 are in a rest position and each are hence closed.

With further reference to FIG. 2, the view 2-II is similar to the view 2-I, however, in the view 2-II, liquid 201 (e.g. water, as depicted), has accumulated in the port 105. For example, the device 101 may have been dropped in liquid, exposed to rain and the like, used by a first responder who has waded and/or swam through water in an emergency situation, and like, such that the liquid 201 has accumulated in the port 105. As such, sound cannot reach the audio transducer 103.

With reference to FIG. 3, the view 2-III is similar to the view 2-II, however, in the view 2-III, the actuator 111 (i.e. the flexible depressible button) is in a depressed position and/or an actuated position, and has been depressed, for example by a finger of user of the device 101. Furthermore, the actuator 111 being depressed forces the air volume 140 through the one-way valve 151, which opens (as depicted in the view 2-III), in response to the air volume 140 being pushed against a side of the one-way valve adjacent the air volume 140. As such, the air volume 140 moves through the portion of the port 105 that is located in front of the audio transducer 103, pushing the liquid 201 through the port 105 and/or through the aperture 153. In the view 2-III pressure on the liquid 201 is represented by the arrows 303.

With further reference to FIG. 3, the view 2-IV is similar to the view 2-III, however, in the view 2-IV, the actuator 111 (i.e. the flexible depressible button) has been released and is relaxing back to a rest position, as represented by the arrow 304. The actuator 111 (i.e. the flexible depressible button) relaxing back to the rest position causes the one-way valve 151 to close: pressure caused by the relaxing flexible depressible button attempts to draw air back from the port 105 through the one-way valve 151, causing the one-way valve 151 to close, for example due to suction.

However, the actuator 111 (i.e. the flexible depressible button) relaxing back to a rest position also causes the second one-way valve 152 to open, for example due to the suction, which draws in air 340 through the air-permeable membrane 130 back into the air volume 140, as represented by the arrows 353. Once the air volume 140 is full, and the actuator 111 (i.e. the flexible depressible button) has relaxed back to the rest position, the suction ends, and the second one-way valve 152 closes back to its respective rest position. In other words, the device 101 returns to the state depicted in the view 2-II.

In such a manner, the liquid 201 is cleared from the port 105. It is furthermore appreciated that the aperture 153 is optional; for example, when the aperture 153 is not present, the liquid 201 is pushed from the port 105 via the port 105.

Indeed, in these embodiments, the liquid clearing mechanism 109 may alternatively be referred to as a mechanical pump and/or a push button pump.

Put yet another way, provided in FIG. 1, FIG. 2 and FIG. 3 is a device comprising a device comprising: an audio transducer; a port from an external surface of the device to the audio transducer; a liquid clearing mechanism for pushing liquid, trapped in the port, out of the port to clear a path for sound between the audio transducer and the external surface; and an actuator for operating the liquid clearing mechanism.

Further provided in FIG. 1, FIG. 2 and FIG. 3 is a device comprising: an audio transducer; a port from an external surface to the audio transducer; a flexible depressible button; an air volume inside the flexible depressible button; and a one-way valve between the air volume and the port, wherein, when the flexible depressible button is depressed, air from the air volume moves through the one-way valve to the port and pushes liquid out of the port, the one-way valve closing when the flexible depressible button relaxes back to a rest position.

Further provided in FIG. 1, FIG. 2 and FIG. 3 is a portable communication device comprising: an audio transducer configured to convert sound to a sound signal; a radio in communication with the audio transducer, the radio configured to wirelessly transmit the sound signal; a port from an external surface to the audio transducer; a liquid clearing mechanism for pushing liquid, trapped in the port, out of the port to clear a path for sound between the audio transducer and the external surface; and an actuator for operating the liquid clearing mechanism.

Figure 4:
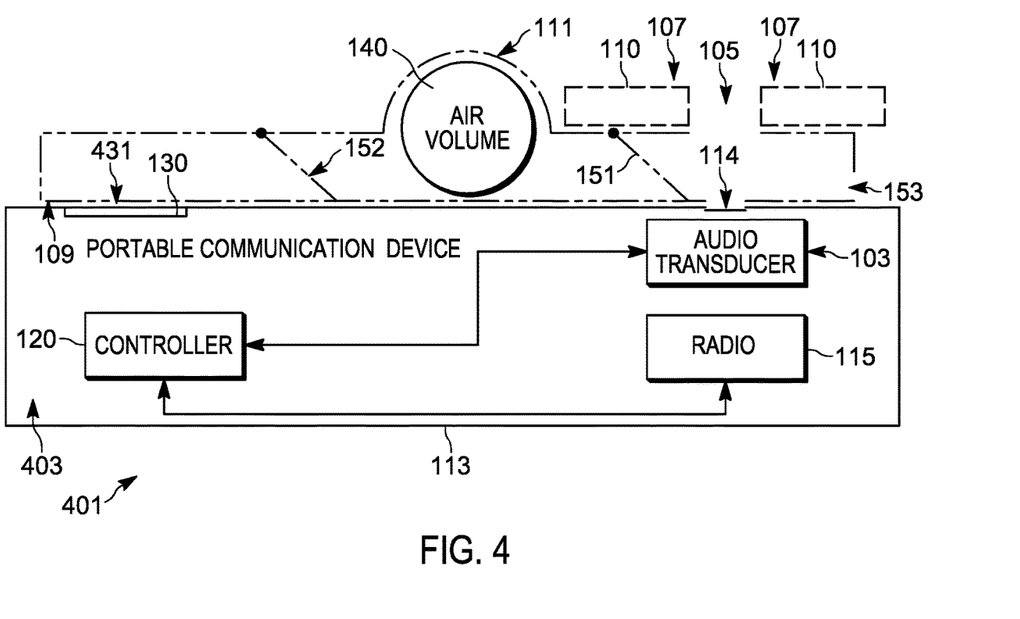
FIG. 4 depicts a device for clearing liquid from an audio transducer where an air volume is vented from an internal volume of the device in accordance with some embodiments.

Attention is next directed to FIG. 4, which depicts a device 401 which is substantially similar to the device 101, with like elements having like numbers. However, in the device 401, the air-permeable membrane 130 is between an interior of the device 401 and an internal volume 403 of the housing 113 of the device 401, for example, the internal volume 403 containing the radio 115 and the controller 120. Furthermore, there are corresponding apertures 431 in the housing 113 and a portion of the liquid clearing mechanism 109 on a side of the second one-way valve 152 opposite the air volume 140. As depicted, the air-permeable membrane 130 is attached (e.g. using an adhesive) to an inside of the housing 113 covering the apertures 431. Hence, when the actuator 111 (e.g. the flexible depressible button) relaxes (e.g. as in the view 2-IV), the air volume 140 is filled with air drawn through the air-permeable membrane 130 from the internal volume 403 of the housing 113.

Figure 5:
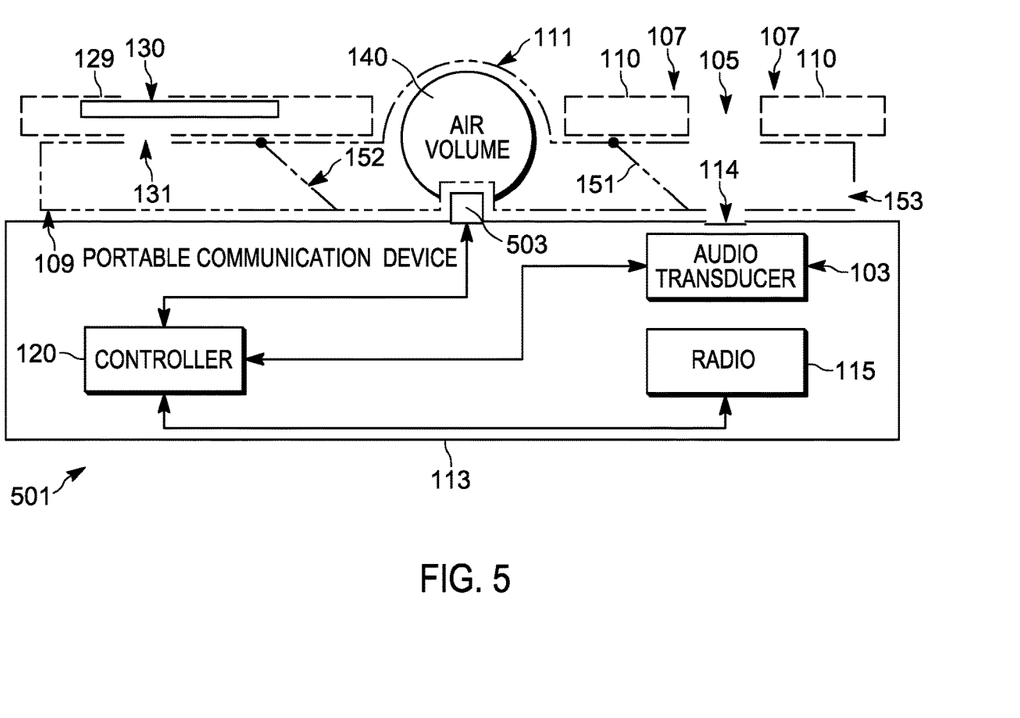
FIG. 5 depicts a device for clearing liquid from an audio transducer which includes a button for actuating the audio transducer in accordance with some embodiments.

Attention is next directed to FIG. 5, which depicts a device 501 which is substantially similar to the device 101, with like elements having like numbers. However, in the device 501, a button 503 for operating the audio transducer 103 and/or the radio 115 extends from the housing 113 in a region of the actuator 111 (e.g. the flexible depressible button), with the flexible integrated unit of the liquid clearing mechanism 109 adapted to conform around the button 503. Hence, when the actuator 111 is actuated, for example by depressing the flexible depressible button, the button 503 is also actuated, which causes both operation of the liquid clearing mechanism 109, as described with respect to FIG. 2 and FIG. 3, as well as actuation of the audio transducer 103 and/or the radio 115. For example, in some embodiments, the button 503 comprises a push-to-talk (PTT) button which actuates push-to-talk functionality of the audio transducer 103 and/or the radio 115, thereby turning on the microphone of the audio transducer 103 as any liquid is cleared away from the microphone of the audio transducer 103.

Figure 6:
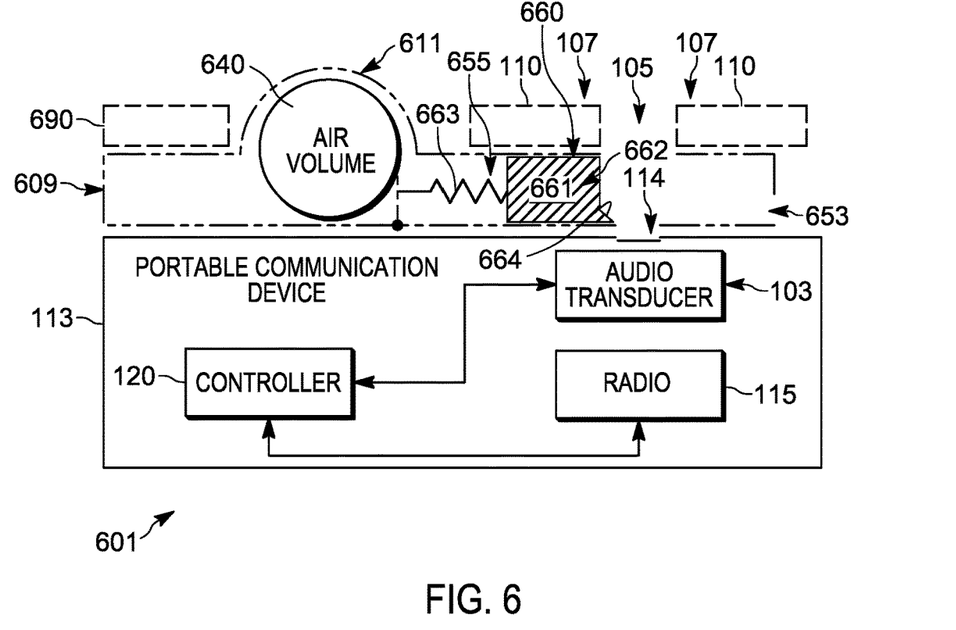
FIG. 6 depicts a device for clearing liquid from an audio transducer which includes an air piston in accordance with some embodiments.

Attention is next directed to FIG. 6, which depicts a device 601 which is similar to the device 101, with like elements having like numbers. In contrast to the device 101, the device 601 includes a liquid clearing mechanism 609 in which an actuator 611, air volume 140 and an aperture 653 are similar to the actuator 111, the air volume 140 and the aperture 653 of the device 101, and further includes a piston 660 having a head 661, a wiper face 662 and a spring mechanism 663, the piston 660 configured to move the wiper face 662 to push liquid out of the port 105, through the aperture 653, when the actuator 111 is actuated.

Put another way, the piston 660 has a wiper face 662 adjacent the membrane 114 in a biased position (e.g. the position depicted in FIG. 6), wherein, when the actuator 611 is actuated, the piston 660 moves the wiper face 662 across the membrane 114 to push liquid out of the port 105, through the aperture 653.

The wiper face 662 is referred to as a "wiper face" as it is generally configured to "wipe" liquid away from the membrane 114. As depicted, the wiper face 662 includes a lip 664 at an edge that, when the wiper face 662 moves across the membrane 114, pushes liquid away from the membrane 114. The lip 664 may be in the form of a wedge, a flap, and the like, and may be flexible and biased in a direction of the membrane 114 (e.g. similar to a windshield wiper biased towards a window), to assist in pushing liquid away from the membrane 114. While the wiper face 662 is depicted as a plane with a lip 664, the wiper face 662 may be any suitable shape and/or may further be flexible to make flexible contact with the membrane 114 during a wiping action. The wiper face 662 may further be coated with a hydrophobic coating.

For example, sides of the head 661 are generally in contact with a passageway 665 along which the head 661 and the wiper face 662 move when the actuator 111 is actuated, the contact between the sides of the head 661 and the passageway 665 generally being airtight. Hence, when the actuator 611 (e.g. a flexible depressible button, similar to the flexible depressible button of the actuator 111) is actuated, the air volume 640 is forced into the passageway 665 which moves head 661 and the wiper face 662 across the membrane 114 and/or an aperture of the housing 113 in which the membrane 114 is located, pushing liquid out of the port 105 through the aperture 153.

Figure 7:
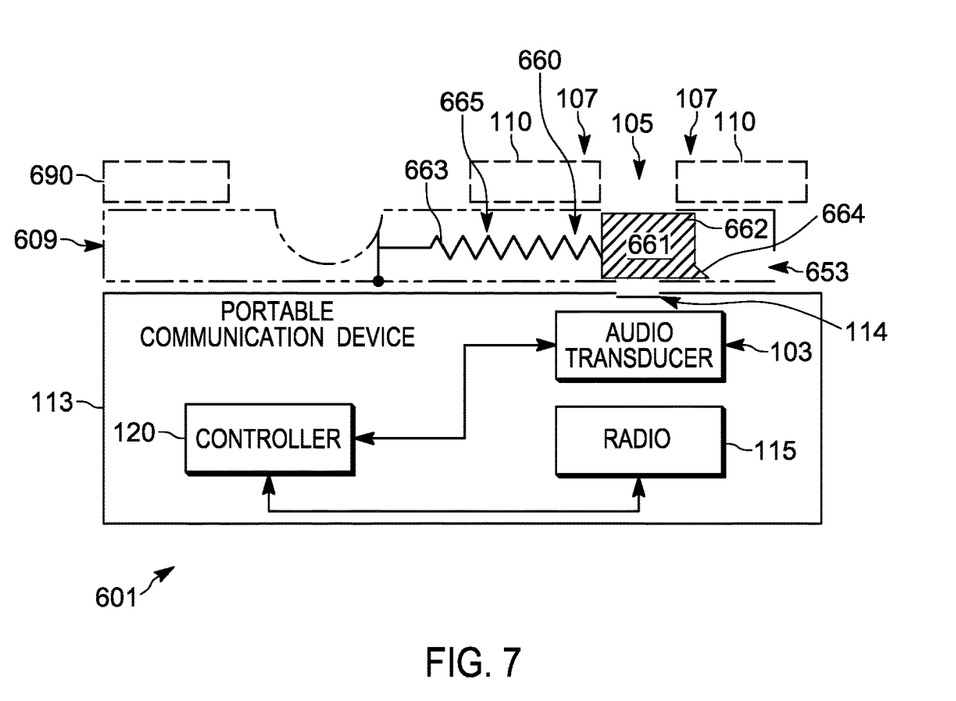
FIG. 7 depicts the device of FIG. 6, with the air piston in an actuated position in accordance with some embodiments.

For example, attention is further directed to FIG. 7 which depicts the device 601 when the actuator 611 is actuated. The air volume 640 has been forced into the passageway 665 which has moved the head 661 and the wiper face 662 (with the lip 664) of the piston 660 across the membrane 114, extending the spring mechanism 663. Any liquid has been pushed out through the aperture 653 by the wiper face 662 and/or the lip 664. Furthermore, the head 661 of the piston 660 forming the wiper face 662 is of a shape that maintains the passageway 665 being airtight as the head 661 moves through the passageway 665; for example, the head 661 blocks the port 105 when the head 661 is in an actuated position, as in FIG. 7.

Alternatively, the piston 660 may include a housing (e.g. similar to a housing depicted in FIG. 8 described below) that maintains the passageway 665 being airtight as the wiper face 662 moves through the passageway 665; in such embodiments, the head 661 of the piston 660 may be replaced with a planar shaped head, and the like, which forms the wiper face 662, that is pushed across the membrane 114 using a rod, and the like, that extends from spring mechanism 663 through the housing of the piston 660 when the actuator 611 is depressed.

When the actuator 611 is released and relaxes to the rest position depicted in FIG. 7, the spring mechanism 663 also relaxes as pressure is released, drawing the head 661 and the wiper face 662 back towards the actuator 611 and out of the port 105. Hence, in the device 601 there is no vent device similar to the vent device 129, as the air volume 640 is contained under the actuator 611 when the actuator 611 is relaxed, and in the passageway 665 when the actuator 611 is depressed. However, as depicted the device 601 further comprises a rigid housing component 690 that, with the cover 110, forms an aperture through which the actuator 611 is accessible to a user.

Put another way, in the embodiment depicted in FIG. 6 and FIG. 7, the actuator 611 comprises a flexible depressible button, and the liquid clearing mechanism 609 comprises the air volume 640 inside the flexible depressible button, the piston 660 comprising an air-power piston between the air volume 640 and the port 105, the air-power piston biased towards the air volume 640 (e.g. using the spring mechanism 663, and the like), such that, when the flexible depressible button is depressed, the air volume 640 causes the air-power piston to move the wiper face 662 to push liquid out of the port 105, through the aperture 653; furthermore, the air-power piston moves back towards the air volume 640 when the flexible depressible button is released.

The device 601 may be further adapted to include a button and/or a push-to-talk button, similar to the button 503, under the actuator 611.

Put yet another way, provided in FIG. 6 and FIG. 7 is a device comprising: an audio transducer; a port from an external surface of the device to the audio transducer; a membrane in the port, covering the audio transducer; an aperture out of the port; a flexible depressible button; an air volume inside the flexible depressible button; and an air-power piston between the air volume and the port, the air-power piston having a wiper face adjacent the membrane in a biased position, the air-power piston biased towards the air volume, wherein, when the flexible depressible button is depressed, the air volume causes the air-power piston to move the wiper face across the membrane to push liquid out of the port, through the aperture.

Figure 8:
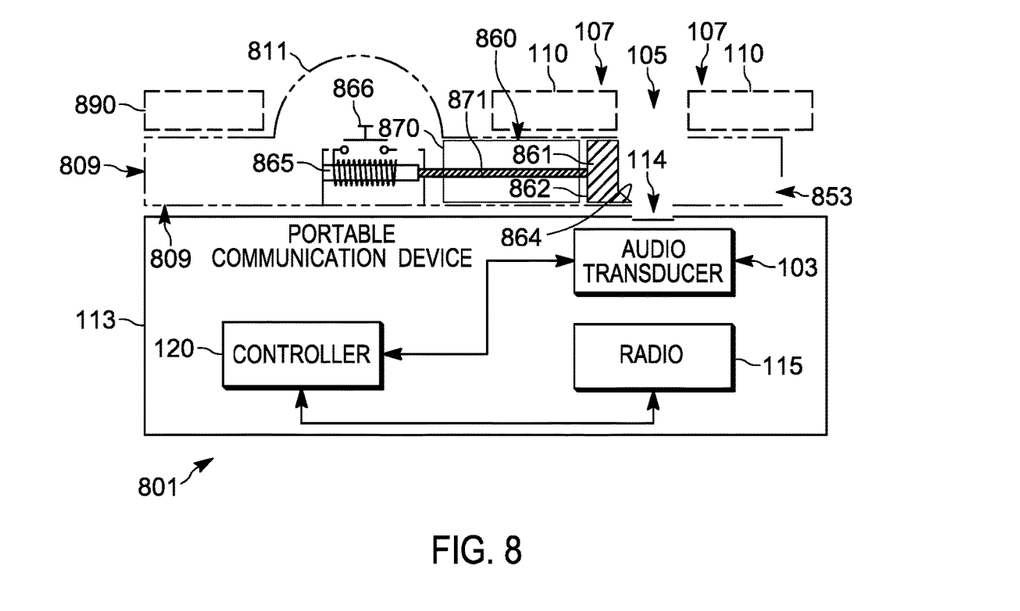
FIG. 8 depicts a device for clearing liquid from an audio transducer which includes a solenoid in accordance with some embodiments.

Attention is next directed to FIG. 8, which depicts a device 801 which is similar to the device 101, with like elements having like numbers. In contrast to the device 101, the device 801 includes a liquid clearing mechanism 809 which includes an actuator 811, an aperture 853 (similar to the aperture 153) and a piston 860. The piston 860 includes a head 861 in the form of a plane having a wiper face 862, including a lip 864 similar to the lip 664, the piston 860 configured to move the wiper face 862 to push (and/or wipe) liquid out of the port 105, through the aperture 853, when the actuator 111 is actuated, similar to the device 601. As depicted in FIG. 8, the piston 860 is in an unactuated position.

In these embodiments, the piston 860 includes a solenoid 865 which, as depicted, includes a switch 866 under the actuator 811 (e.g. a flexible depressible button) which, when the actuator 811 is depressed also causes the switch 866 to be actuated to in turn actuate the solenoid 865, thereby causing the solenoid 865 to move the wiper face 862 across the membrane 114 to push liquid out of the port 105 through the aperture 853.

As depicted, the piston 860 further comprises a housing 870 that maintains liquid tightness between the port 105 and the solenoid 865 such that liquid from the port 105 does not leak into the region of the solenoid 865. A rod 871 extends from the solenoid 865 through the housing 870 to move the wiper face 862.

When the actuator 811 is released, the switch 866 is also released, causing the solenoid to move back to a rest position, drawing the wiper face 862 back across the membrane 114 to a rest position and out of the port 105.

The solenoid 865 may be powered from a battery and/or a power supply of the device 101 and/or may be provided with its own battery and/or power supply, for example integrated into the liquid clearing mechanism 809.

Similar to the device 601, as depicted the device 801 further comprises a rigid housing component 890 that, with the cover 110, forms an aperture through which the actuator 811 is accessible to a user.

In some embodiments, however, the actuator 811 and the switch 866 may be replaced by a button at the device 801, for example a push-to-talk button and the like, which may be used to actuate the solenoid 865 and which may be located at any suitable position at the housing 113. In some embodiments, the actuator 811 and the switch 866 may be replaced by a virtual button provided at a display device (not depicted) which, when actuated, causes the solenoid 865 to be actuated, and which may also operate the radio 115, the audio transducer 103 and/or push-to-talk functionality. Hence, the solenoid 865 may be actuated using an actuator that includes, but is not limited to, one or more of a mechanical actuator, an electrical actuator, a virtual button, a button, and a push-to-talk button.

Put yet another way, provided in FIG. 8 is a device comprising: an audio transducer; a port from an external surface of the device to the audio transducer; a membrane in the port, covering the audio transducer; an aperture out of the port; an actuator; and a piston including a solenoid, the piston having a wiper face adjacent the membrane in an unactuated position, wherein, when the actuator is actuated, the solenoid moves the wiper face across the membrane to push liquid out of the port, through the aperture.

Figure 9:
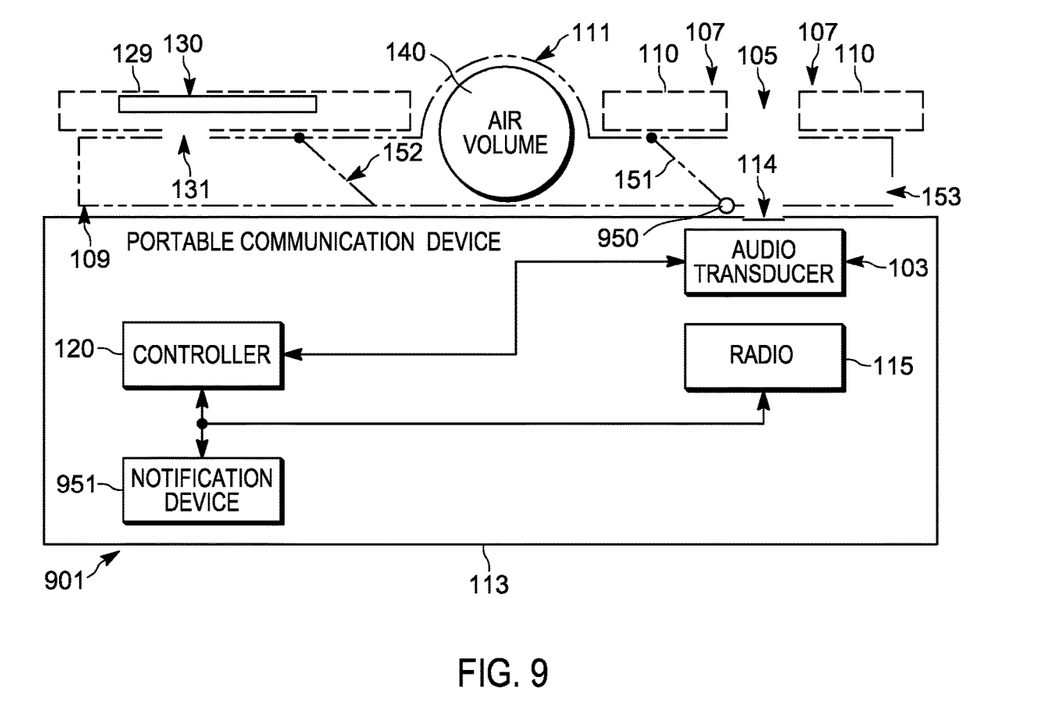
FIG. 9 depicts a device for clearing liquid from an audio transducer which includes a liquid sensor in accordance with some embodiments.

Attention is next directed to FIG. 9 which depicts a device 901 similar to the device 101, with like elements having like numbers. However, the device 901 further includes a liquid sensor 950 in the port 105 (e.g. located at the membrane 114) and a notification device 951, the notification device 951 providing a notification of liquid in the port 105 when sensed by the liquid sensor 950. For example, the notification device 951 may comprise one or more of a display device, a light, a speaker device, and a haptic device, and the notification may comprise one or more of a notification at the display device, the light turning on, the speaker device emitting sound, and the haptic device vibrating. While not depicted, it is assumed in FIG. 9 that the liquid sensor 950 is in communication with the controller 120, which is also in communication with the notification device 951. The controller 120 generally controls the notification device 951 to provide a notification when the controller 120 receives a signal from the liquid sensor 950 indicative of liquid being detected.

Furthermore, any of the devices 401, 501, 601, 801 may be adapted to include a similar liquid sensor and a similar notification device. In particular, when the device 801 includes a liquid sensor, the solenoid 865 may be automatically actuated to push liquid out of the port 105 when the liquid sensor detects liquid in the port.

Provided herein is a device for clearing liquid from an audio transducer which, in some embodiments, is manually operated and, in other embodiments is electrically operated.

Liquid is pushed out of a port of the audio transducer, for example through the port and/or through an additional aperture.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of at least two items X, Y, and Z (e.g., XYZ, XY, YZ, ZZ, and the like). Similar logic may be applied for at least two items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
    an audio transducer;
    a port from an external surface to the audio transducer;
    an aperture for evacuating liquid from the port, the aperture being different from the port;
    a flexible depressible button;
    an air volume inside the flexible depressible button; and
    a one-way valve between the air volume, and the port and the aperture, wherein, when the flexible depressible button is depressed, air from the air volume moves through the one-way valve to the port and pushes liquid out through the aperture, the one-way valve closing when the flexible depressible button relaxes back to a rest position.

2. The device of claim 1, wherein the aperture is located along an airflow path, and the port is about perpendicular to the airflow path.

3. The device of claim 1, further comprising a liquid sensor in the port and a notification device, the notification device providing a notification of the liquid in the port when sensed by the liquid sensor.

4. The device of claim 1, further comprising a second one-way valve between the air volume and an air-permeable membrane, the second one-way valve being closed when the flexible depressible button is depressed, and open when the flexible depressible button relaxes to the rest position, such that replacement air moves through the air-permeable membrane to fill the air volume.

5. The device of claim 4, wherein the air-permeable membrane is water-impermeable and is between an interior of the device and an exterior of the device.

6. The device of claim 4, wherein the air-permeable membrane is between an interior of the device and an internal volume of a housing of the device.

7. The device of claim 4, wherein the air-permeable membrane comprises one or more of an air-breathable waterproof membrane material and GORE-TEX.

8. A portable communication device comprising:
    an audio transducer configured to convert sound to a sound signal;
    a radio in communication with the audio transducer, the radio configured to wirelessly transmit the sound signal;
    a port from an external surface to the audio transducer;
    an aperture for evacuating liquid from the port, the aperture being different from the port;
    a flexible depressible button;
    an air volume inside the flexible depressible button; and
    a one-way valve between the air volume, and the port and the aperture, wherein, when the flexible depressible button is depressed, air from the air volume moves through the one-way valve to the port and pushes liquid out through the aperture, the one-way valve closing when the flexible depressible button relaxes back to a rest position.

9. The portable communication device of claim 8, further comprising an actuator for operating the radio, the actuator positioned for actuation when the flexible depressible button is depressed.

10. The portable communication device of claim 9, wherein the actuator is further for operating a push-to-talk feature of the radio.

11. The portable communication device of claim 8, further comprising a liquid sensor in the port and a notification device, the notification device providing a notification of the liquid in the port when sensed by the liquid sensor.

12. The device of claim 8, further comprising a second one-way valve between the air volume and an air-permeable membrane, the second one-way valve being closed when the flexible depressible button is depressed, and open when the flexible depressible button relaxes to the rest position, such that replacement air moves through the air-permeable membrane to fill the air volume.

13. The device of claim 12, wherein the air-permeable membrane is water-impermeable and is between an interior of the device and an exterior of the device.

14. The device of claim 12, wherein the air-permeable membrane is between an interior of the device and an internal volume of a housing of the device.

15. The device of claim 12, wherein the air-permeable membrane comprises one or more of an air-breathable waterproof membrane material and GORE-TEX.

16. The device of claim 8, wherein the aperture is located along an airflow path, and the port is about perpendicular to the airflow path.

* * * * *